United States Patent Office 3,829,313
Patented Aug. 13, 1974

3,829,313
BRAZING ALLOY
Eugene H. Bradburn, Concord, and James T. Tidwell, Oak Ridge, Tenn., assignors to the United States of America as represented by the United States Atomic Energy Commission
No Drawing. Filed Mar. 7, 1973, Ser. No. 338,810
Int. Cl. C22c 21/02
U.S. Cl. 75—146     3 Claims

ABSTRACT OF THE DISCLOSURE

An aluminum base brazing alloy for aluminum which is resistant to a fluorine and fluoride atmosphere containing silicon and zinc, and wherein the silicon is present as a discontinuous phase.

BACKGROUND OF THE INVENTION

This invention was made in the course of, or under, a contract with the United States Atomic Energy Commission. It releates generally to a new brazing alloy.

In many areas of technology it is necessary to contain fluorine and fluoride containing atmospheres. While many metals and alloys are suitable for such containment, only aluminum alloys possess the necessary thermal conductivity requirements for carrying out heat exchange in such an atmosphere. In joining members made from such aluminum alloys, it was found that no commercial brazing alloys were available which could withstand a fluorine atmosphere and braze with the ease required in a production operation.

A conventional brazing alloy consisting essentially of 88 wt. percent Al-12 wt. percent Si was found to produce excellent joints; however, the silicon phase was found to be subject to attack by fluorine. Another conventional alloy tested was 4043 composed of

|    | Wt. percent |
|----|-------------|
| Si | 4.5–6       |
| Fe | 0.8         |
| Cu | 0.3         |
| Zn | 0.1         |
| Al | Balance     |

While this alloy was found to produce joints which were resistant to fluorine attack, its melting point was in some cases higher than that of the alloy being brazed.

SUMMARY OF THE INVENTION

It is thus an object of this invention to provide a brazing alloy for aluminum and its alloys which possesses a satisfactory melting point and is resistant to attack by fluorine and fluoride containing atmospheres.

This object as well as other objects is accomplished by using an alloy composed of aluminum, zinc and silicon such that silicon is present only as a discontinuous phase.

DETAILED DESCRIPTION

According to this invention it has been found that an aluminum-zinc alloy containing sufficient silicon to give the flow properties which render it suitable for brazing but less silicon than that which will develop a continuous silicon phase are resistant to fluorine attack and possess the necessary melting characteristics for brazing. It has been found that aluminum alloys containing a discontinuous silicon phase will lose silicon to a fluorine environment only from the surface thereof. However, aluminum alloys containing a continuous silicon phase will be attacked throughout, thus weakening and deleteriously affecting the properties thereof. The alloy of this invention thus comprises only those materials which have a discontinuous silicon phase. By the use of the term "discontinuous silicon phase" it is meant that under microscopic examination of a plane, the silicon phase cannot be continuously traced from the exposed surface to greater than 0.050 inch below that surface.

The preferred composition for this brazing alloy is

|    | Wt. percent |
|----|-------------|
| Si | 5.5         |
| Zn | 10          |
| Al | Balance     |

This alloy has a melting point of about 590° C. and possesses the requisite flow properties for a brazing alloy, including capillary flow. More broadly, the brazing alloy of this invention comprises

|          | Wt. percent |
|----------|-------------|
| Si       | 4.5–6       |
| Zn       | 9–12        |
| Aluminum | Balance     |

This alloy has a melting point within the range of 585° to 600° C. It is understood that various impurities such as up to 0.8 wt. percent Fe and 0.3 wt. percent Cu may also be present in the alloy of this invention without adversely affecting the properties thereof. Other impurities may also include minor amounts of Mn, Mg, and Ti.

The above limits of silicon and zinc content are critical. Less than about 4.5 wt. percent silicon will produce an alloy which has less than the necesary flow properties for a brazing alloy. An amount of zinc in exces of about 6 to 7 wt. percent will produce a continuous silicon phase which would thus be subject to fluorine attack.

The zinc content must be maintained within the above limits in order to produce the necessary melting point and to prevent embrittlement. If the zinc content is below 9 wt. percent, the alloy will have a melting point which is too high for brazing. If the zinc content is greater than about 12 wt. percent, the alloy tends to embrittle.

The preferred method of preparing the alloy of this invention is to melt commercial alloy 4043 in air and adding enough zinc thereto to comprise a total zinc content of about 10 wt. percent. The oxide is, of course, skimmed from the top of this melt prior to cooling or forming a shape to be used in a brazing operation.

All aluminum alloys with a melting point greater than 620° C. are brazable with this alloy, however, the alloys of particular interest are 1100 and 3003. Others which may be suitable are EC, 1060, 1345, 5005, 5457, 5357, 5557, 6563, and 7072.

The following specific example is given to illustrate preparation and use of the alloy of this invention and particularly the resistance to fluorine attack exhibited by the alloy of this invention.

EXAMPLE

The subject brazing alloy was prepared by adding 15 grams of zinc metal to 135 grams of aluminum alloy 4043 obtained from the Atlas Company, Cincinnati, Ohio, in the form of welding wire. This mixture was heated to about 650° C. in air and homogenized by holding at 480° C. for 4 hours after casting. The rod formed from the above casting was then rolled into strip (0.029 to 0.045 inch thick). Rings cut from this strip were internally placed in a bell or socket type joint of ⅝ inch 1100 aluminum tubing. This tubing (0.035 inch wall thickness) had been prepared for brazing by degreasing with acetone, etching with 10% NaOH solution, rinsing with 60% $HNO_3$ solution followed by a hot water rinse and air drying. Brazing was accomplished by placing the joint in a tube-type electrical resistance heater and heating the joint in air until the braze metal was observed to wet and flow around the joint. Alcoa number 33 paste flux was used to aid in making the brazed joint.

Corrosion tests were made in fluorine at elevated temperature. Both static (100% $F_2$) and dynamic (1% $F_2$-

99% $N_2$) atmosphere were used in these tests on the brazed joints. Metallographic examination and electron microprobe analysis after 2 days and 8 days exposure has shown that silicon is leached out by fluorine only from the surface and not from the bulk of the brazing alloy. Three brazed joints were hydrostatically pressure tested after brazing, two were tested after 24 hours in air at 750° F., and two after 22 hours in air at 900° F. All these samples ruptured outside the brazed joint at an internal pressure of 1100 to 1150 pounds per square inch.

It is thus seen that the alloy of this invention provides a superior means for brazing aluminum alloys and produces a brazed joint which is resistant to fluoride attack.

What is claimed is:

1. An alloy suitable for brazing aluminum alloys consisting essentially of

| | Wt. percent |
|---|---|
| Si | 4.5–6 |
| Zn | 9–12 |
| Aluminum | Balance | and wherein said Si is present as a discontinuous phase.

2. The alloy of claim 1 further including up to .08 wt. percent Fe and up to 0.3 wt. percent Cu.

3. The alloy of claim 1 consisting essentially of

| | Wt. percent |
|---|---|
| Si | 5.5 |
| Zn | 10 |
| Aluminum | Balance |

References Cited

UNITED STATES PATENTS

| 1,572,459 | 2/1926 | Archer et al. | 75—141 |
| 1,572,490 | 2/1926 | Johnson et al. | 75—141 |
| 2,602,413 | 7/1952 | Miller | 75—146 |

RICHARD O. DEAN, Primary Examiner

U.S. Cl. X.R.

75—141

UNITED STATES PATENT OFFICE
CERTIFICATE OF CORRECTION

Patent No. 3,829,313　　　　　　　　Dated August 13, 1974

Inventor(s) Eugene H. Bradburn et al

It is certified that error appears in the above-identified patent and that said Letters Patent are hereby corrected as shown below:

Column 4, line 1, ".08" should read --0.8--.

Signed and sealed this 5th day of November 1974.

(SEAL)
Attest:

McCOY M. GIBSON JR.　　　　　　　　C. MARSHALL DANN
Attesting Officer　　　　　　　　　Commissioner of Patents